(12) United States Patent
Lee et al.

(10) Patent No.: US 10,115,935 B2
(45) Date of Patent: Oct. 30, 2018

(54) CORROSION RESISTANT TUBE FOR SECONDARY BATTERY AND SECONDARY BATTERY COMPRISING THE SAME

(71) Applicant: LG CHEM, LTD., Seoul (KR)

(72) Inventors: Je Jun Lee, Daejeon (KR); Hang Soo Shin, Daejeon (KR); Sang Sok Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 82 days.

(21) Appl. No.: 14/855,050

(22) Filed: Sep. 15, 2015

(65) Prior Publication Data

US 2016/0099439 A1    Apr. 7, 2016

(30) Foreign Application Priority Data

Oct. 2, 2014   (KR) .......................... 10-2014-0133468

(51) Int. Cl.
*H01M 2/02*    (2006.01)
*C23F 11/02*   (2006.01)

(52) U.S. Cl.
CPC ............. *H01M 2/022* (2013.01); *C23F 11/02* (2013.01); *H01M 2/0257* (2013.01); *H01M 2/0292* (2013.01)

(58) Field of Classification Search
None
See application file for complete search history.

(56) References Cited

U.S. PATENT DOCUMENTS

| | | | |
|---|---|---|---|
| 5,814,419 A | 9/1998 | Kenyon et al. | |
| 6,033,599 A * | 3/2000 | Lozano | C23F 11/02 252/389.54 |
| 6,787,065 B1 * | 9/2004 | Schapira | B32B 27/08 252/389.61 |
| 2007/0154784 A1 * | 7/2007 | Seo | H01M 2/0207 429/61 |
| 2007/0207379 A1 * | 9/2007 | Hatta | H01M 2/0207 429/176 |
| 2011/0039128 A1 * | 2/2011 | Baek | H01M 2/02 429/7 |
| 2013/0189566 A1 * | 7/2013 | Zinck | H01M 4/485 429/163 |

FOREIGN PATENT DOCUMENTS

| | | |
|---|---|---|
| JP | 57-73869 U | 5/1982 |
| JP | 2002-504629 A | 2/2002 |
| JP | 2004-311167 A | 11/2004 |
| JP | 2012-530036 A | 11/2012 |
| KR | 10-2014-0066336 A | 6/2014 |
| WO | WO 2010/146169 A2 | 12/2010 |

* cited by examiner

*Primary Examiner* — Kenneth J Douyette
*Assistant Examiner* — Christopher P Domone
(74) *Attorney, Agent, or Firm* — Birch, Stewart, Kolasch & Birch, LLP

(57) ABSTRACT

Provided is a corrosion resistant tube for a secondary battery including a volatile corrosion inhibitor (VCI) and a base resin, and a secondary battery including the same. The corrosion resistant tube of the present invention prevents the occurrence of rust or the occurrence of corrosion in a battery cell, and therefore, is capable of enhancing stability of the battery.

11 Claims, 3 Drawing Sheets

A CORROSION RESISTANT TUBE

CYLINDRIAL BATTERY BEFORE COATING A CORROSION RESISTANT TUBE

A CORROSION RESISTANT TUBE

CORROSION RESISTANT TUBE FOR SECONDARY BATTERY AND SECONDARY BATTERY COMPRISING THE SAME

TECHNICAL FIELD

The present disclosure relates to a corrosion resistant tube for a secondary battery and a secondary battery including the same, and specifically, relates to a corrosion resistant tube for a secondary battery including a volatile corrosion inhibitor, and a secondary battery including the same.

BACKGROUND ART

Demands for secondary batteries as an energy source have rapidly increased as technology development and demands for mobile devices have increased. In addition, among such secondary batteries, studies on lithium secondary batteries having high energy density and a discharge voltage have been extensively carried out, and lithium secondary batteries are commercialized and widely used.

Secondary batteries are divided into, depending on the shape of a battery case, a cylindrical battery and a rectangular battery in which an electrode assembly is built in a cylindrical or rectangular metal can, and a pouch-type battery in which an electrode assembly is built in a pouch-type case of an aluminum laminate sheet.

Generally, a cylindrical secondary battery includes a can, an electrode assembly housed inside the can; a cap assembly combined to an upper opening of the can; and a washer installed on an upper part of the cap assembly.

In addition, in the cylindrical secondary battery, an outer surface of the can is coated (tubed) with an insulating outer cover to obtain an effect of protecting a battery cell from external shock and complementing mechanical strength of members installed on the upper part of the battery cell while performing a function of insulation, a function of can fixation, a function of lot number printing and the like. Moreover, stability of the battery cell may be enhanced by preventing an internal short circuit of a battery capable of being caused by corrosion of the battery cell and corrosion of electronic devices such as a protection circuit module (PCM).

Generally, tapes or tubes formed with a heat shrinkable resin such as a PET material haven been used for coating an outer surface of a can of a cylindrical secondary battery. However, tubing is readily broken from consistent shock or instantaneous strong shock during a Drop test, and rust also occurs when exposed to a harsh atmosphere of high temperature and humidity, which leads to a problem of declining a lifespan and stability of a secondary battery.

In order to solve such a problem, improvements such as development of tubing materials, design changes in tubing or methods of insulating a secondary battery surface other than tubing have been required.

DISCLOSURE

Technical Problem

An object of the present invention is to provide a corrosion resistant tube for a secondary battery capable of preventing the occurrence of battery corrosion under a high temperature and humidity environment, and a secondary battery including the same.

Technical Solution

In view of the above, the present invention provides a corrosion resistant tube for a secondary battery including a volatile corrosion inhibitor (VCI) and a base resin.

In addition, the present invention provides a secondary battery in which an electrode assembly having a structure of a positive electrode/separation membrane/negative electrode is built in a metal can, wherein, in the secondary battery, a washer is mounted on an upper part of a cap assembly installed on an opened upper part of the metal can with the electrode assembly built therein, and the surface of the metal can with the electrode assembly built therein is coated with the corrosion resistant tube for a secondary battery of the present invention.

Advantageous Effects

In the present invention, an outer surface of a cylindrical secondary battery can is coated (tubed) using a corrosion resistant tube for a secondary battery including a volatile corrosion inhibitor, and therefore, a lifespan, safety and stability of the battery can be enhanced by preventing the occurrence of corrosion when the battery is exposed to a high temperature and humidity environment.

MODE FOR DISCLOSURE

Figure 1A:
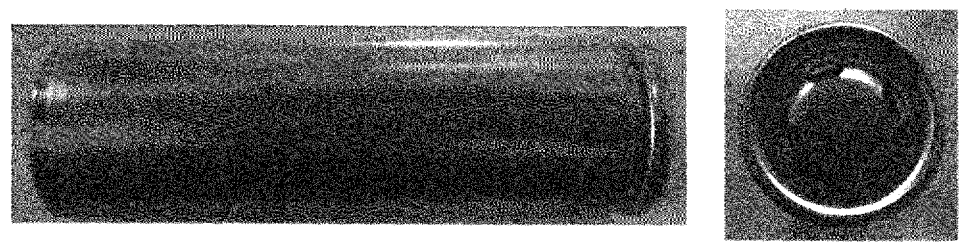
FIG. 1A shows an actual photograph of a cylindrical battery prior to being coated (tubed) with a corrosion resistant tube according to one embodiment of the present invention.
Figure 1A:
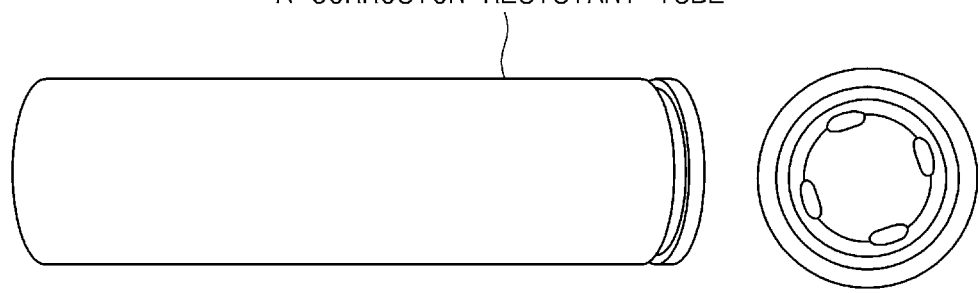
Figure 1B:
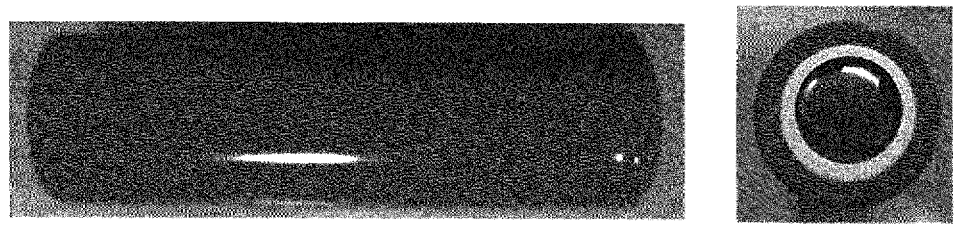
FIG. 1B shows an actual photograph of a cylindrical battery after being coated (tubed) with a corrosion resistant tube according to one embodiment of the present invention.
Figure 1B:
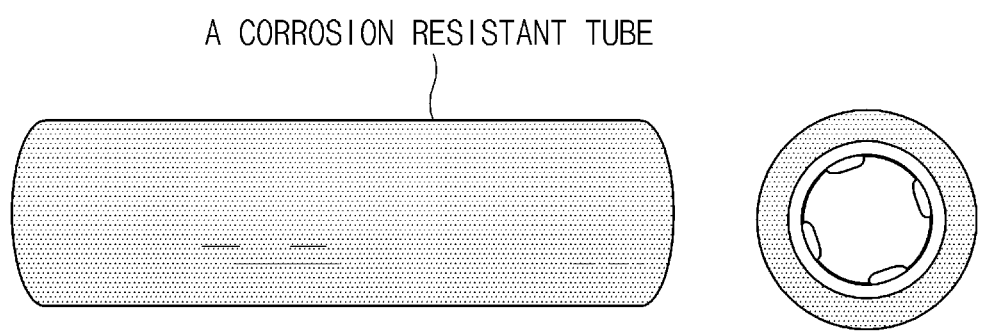

Hereinafter, the present invention will be described in more detail in order to promote understanding for the present invention.

Terms and words used in the present specification and the claims are not to be interpreted limitedly as common or dictionary definitions, and shall be interpreted as meanings and concepts corresponding to technological ideas of the present invention based on a principle in which the inventors may suitably define the concepts of terms in order to describe the invention in the best possible way.

Specifically, one embodiment of the present invention provides a corrosion resistant tube for a secondary battery including a volatile corrosion inhibitor (VCI) and a base resin.

The corrosion resistant tube for a secondary battery of the present invention has an excellent corrosion inhibiting property, and thereby is capable of enhancing safety of a battery by preventing the occurrence of corrosion on the outer surface of a can when the cylindrical secondary battery is exposed to a high temperature and humidity environment. Herein, the corrosion inhibiting property is a property preventing the production of a hydroxide or oxide compound on a metal surface, and means a property preventing the generation of decomposed products on a metal surface.

Specifically, in the corrosion resistant tube for a secondary battery of the present invention, the volatile corrosion inhibitor has a sublimating property at room temperature, and may be formed with $NaNO_2$ or $NaNO_3$ having a corrosion inhibiting property, or a mixture having the compounds as a main component. Specifically, the volatile corrosion inhibitor includes a polymer resin, and one or more of $NaNO_2$ and $NaNO_3$.

In the volatile corrosion inhibitor, the polymer resin is a component performing a role of protecting a battery outer wall and preventing a positive electrode terminal (top cap) and a negative electrode terminal (can) from contacting with each other, and commonly used polymer resins or polymer synthetic resins may be used. For example, one selected from the group consisting of polypropylene (PP), polybutylene terephthalate (PBT), polyethylene, polyethylene terephthalate (PET), teflon, polytetrafluoroethylene, rayon, mixed yarn, polyviscose and polynosic nylon, or a mixture of two or more types among these may be included, however, the polymer resin is not limited thereto.

In addition, the $NaNO_2$ or $NaNO_3$ may be used within 10 parts by weight with respect to 100 parts by weight of the polymer resin in the volatile corrosion inhibitor, however, the content is not limited thereto.

The corrosion resistant tube for a secondary battery of the present invention may include the volatile corrosion inhibitor in 2 to 10 parts by weight with respect to 100 parts by weight of the base resin. The content of less than 2 parts by weight is not effective in corrosion inhibition, and when the content is greater than 10 parts by weight, problems may occur during a manufacturing process.

In addition, in the corrosion resistant tube for a secondary battery of the present invention, commonly used polymer resins or polymer synthetic resins may be used as the base resin, and examples thereof may include one selected from the group consisting of polyethylene terephthalate (PET), nylon and polybutylene terephthalate (PET), or a mixture of two or more types among these.

Figure 2:
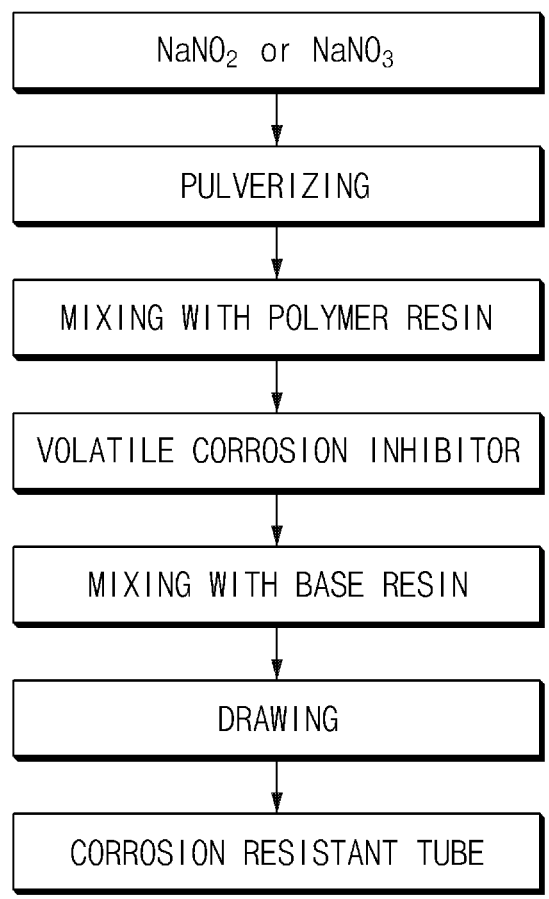
FIG. 2 shows a manufacturing process of a corrosion resistant tube according to one embodiment of the present invention.

Meanwhile, a process for manufacturing the corrosion resistant tube for a secondary battery of the present invention is illustrated in FIG. 2, however, the process is not limited thereto.

When examining FIG. 2, the $NaNO_2$ or $NaNO_3$ is finely pulverized until it has a uniform property. The pulverized $NaNO_2$ or $NaNO_3$ is mixed with a polymer resin to obtain a volatile corrosion inhibitor. The volatile corrosion inhibitor is mixed with a base resin, and then drawn and coated on the outer surface of a can of a cylindrical secondary battery to prepare a corrosion resistant tube.

Such a corrosion resistant tube for a secondary battery of the present invention may be formed using a general method of coating the surface of a cylindrical secondary battery cell with a non-conductive material, however, specifically, after preparing a corrosion resistant tube for a secondary battery, a cylindrical secondary battery is inserted to the corrosion resistant tube, and hot air is applied to shrink the tube by heat, and the tube may be formed in the form of a heat-shrinkable tube surrounding the cylindrical secondary battery.

The process of pulverizing $NaNO_2$ or $NaNO_3$ may be carried out at room temperature and atmospheric pressure. $NaNO_2$ or $NaNO_3$ need to be evenly dispersed in a uniform state in order to produce a corrosion resistant tube containing a uniform volatile corrosion inhibitor, and to further enhance a corrosion inhibiting property of a battery. The pulverized $NaNO_2$ or $NaNO_3$ is mixed with a melted polymer resin, preferably, a melted polypropylene resin. Herein, solvent and other additives may be used when mixing, and those known in the art and commonly used may be used.

Herein, the volatile corrosion inhibitor may be, for example, pelleted for easy storage and use, and the pelleting may be carried out at room temperature and atmospheric pressure.

In the process for manufacturing the corrosion resistant tube, a solvent and other additives used in the art may be further added and used, and the above-mentioned method is merely one example, and the present invention is not limited thereto.

In addition, one embodiment of the present invention provides a secondary battery in which an electrode assembly having a structure of a positive electrode/separation membrane/negative electrode is built in a metal can, and, in the secondary battery, a washer is mounted on an upper part of a cap assembly installed on an opened upper part of the metal can with the electrode assembly built therein, and the surface of the metal can with the electrode assembly built therein is coated with the corrosion resistant tube for a secondary battery of the present invention.

Herein, in the secondary battery of the present invention, the corrosion resistant tube preferably has a coating thickness of 0.05 mm to 0.1 mm.

In one embodiment of the present invention, the corrosion resistant tube may perform a corrosion preventing function by the principle such as below.

Specifically, $NaNO_2$ or $NaNO_3$ may be dispersed into the corrosion resistant tube in a crystal state, and by some of $NaNO_2$ (sodium nitrite) forming $NaNO_3$ (sodium nitrate) from slow oxidation in the air, $NaNO_2$ and $NaNO_3$ may coexist inside the corrosion resistant tube. The $NaNO_2$ and the $NaNO_3$ meet moisture in the air and form $HNO_2$ (nitrous acid) and $HNO_3$ (nitric acid), and herein, $HNO_3$ is capable of preventing corrosion by finely oxidizing a metal surface of a metal can of a secondary battery.

According to one embodiment of the present invention, these $HNO_2$ and $HNO_3$ may form gamma iron trioxide ($\gamma$-$Fe_2O_3$) at the end of a metal can to a thickness of 10 Å to 1000 Å by the action of VCI gas when, for example, these $HNO_2$ and $HNO_3$ react with an iron surface of the metal can.

Such gamma iron trioxide ($\gamma$-$Fe_2O_3$) formed at the end of the metal can is capable of further preventing the occurrence of rust in a battery cell.

In the present invention, the metal can may be a cylindrical can or rectangular can. When the secondary battery according to one embodiment of the present invention is a cylindrical can, it may have a structure in which a positive electrode protruded terminal connected to the electrode assembly is formed in the middle of the cap assembly, the cap plate is connected to the positive electrode terminal, and the can forms a negative electrode terminal.

When the secondary battery is a rectangular can as another example, it may have a structure in which a negative electrode protruded terminal connected to an electrode terminal is formed in the middle of the cap assembly, the rectangular can and the cap plate form a positive electrode terminal while being insulated from the negative electrode terminal.

In addition, in the secondary battery of the present invention, the washer is fixed on the upper surface of the cap assembly through adhesion or mechanical binding, and, like the corrosion resistant tube of the present invention, is preferably a corrosion inhibiting washer including a volatile corrosion inhibitor and a base resin.

Herein, each constituent provided for constituting the corrosion inhibiting washer, that is, the volatile corrosion inhibitor and the base resin for a corrosion inhibiting washer may use the same component as each constituent constituting the corrosion resistant tube of the present invention, therefore, the description will not be repeated.

The secondary battery according to the present invention is preferably a lithium secondary battery having high energy density, a high discharge voltage, and high output stability. Such a lithium secondary battery is formed with a positive electrode, a negative electrode, a separation membrane, a non-aqueous electrolyte containing a lithium salt, and the like.

The positive electrode is prepared by, for example, coating a mixture of a positive electrode active material, a conductor and a binder on a positive electrode collector, and drying the result, and a filler is further added as necessary. The negative electrode is prepared by coating a negative electrode material on a negative electrode collector, and drying the result, and components described above may be further included as necessary.

The separation membrane is provided between the negative electrode and the positive electrode, and as such a separation membrane, thin films having an insulating property and having high ion permeability and mechanical strength are used.

The non-aqueous electrolyte containing a lithium salt is formed with a non-aqueous electrolyte and a lithium salt, and as the non-aqueous electrolyte, a liquid non-aqueous electrolyte, a solid electrolyte, an inorganic solid electrolyte and the like may be used.

As the collector, the electrode active material, the conductor, the binder, the filler, the separation membrane, the electrolyte, the lithium salt and the like, those commonly known in the art may be used.

The secondary battery according to the present invention may be manufactured using common methods known in the art. In other words, the secondary battery may be manufactured by inserting a porous separation membrane between a positive electrode and a negative electrode, and injecting an electrolyte thereto.

As described above, the positive electrode may be prepared by, for example, coating slurry containing a lithium transition metal oxide active material as a positive electrode active material, a conductor and a binder on a collector, and then drying and rolling the result. Likewise, as described above, the negative electrode may be prepared by, for example, coating slurry containing a carbon active material as a negative electrode active material, a conductor and a binder on a thin collector, and then drying the result.

Meanwhile, FIG. 1 shows an actual photograph of a cylindrical battery (A) prior to and (B) after coating a corrosion resistant tube.

When examining (A) and (B) of FIG. 1, in the cylindrical battery according to one embodiment of the present invention, an electrode assembly is inserted into a can as a power generating element, an electrolyte is injected thereto, and a cap assembly is installed on an upper opening of the can. Preferably, the cap assembly selectively includes at least one or more positive temperature coefficient (PTC) elements for preventing an overcurrent and at least one or more safety vents for maintaining a pressure inside a battery in a normal state. Specifically, the PTC element and/or the safety vent for blocking an overcurrent to the upper cap are closely installed inside a gasket for maintaining air tightness mounted on a bidding unit of an upper part of the can. The upper cap is protruded upward in the middle, and performs a role of a positive electrode terminal through the contact with an external circuit. The lower part of the safety vent is connected to the positive electrode of the power generating element through a Current Interruptive Device (CID) and a positive electrode lid. Subsequently, a washer having an overall circular structure is formed so as to be mounted on an upper part of the bidding unit while surrounding the upper cap of the cap assembly.

Next, a corrosion resistant tube may be formed while being coated (tubed) surrounding an outer surface of the can while the cap assembly is installed surrounding an outer circumference surface of the washer. After that, a corrosion resistant tube is cured by applying specified heat.

Hereinafter, the present invention will be described in more detail with reference to examples. However, the examples according to the present invention may be modified to various other forms, and the scope of the present invention is not interpreted to be limited to the examples described below. The examples of the present invention are provided in order to more completely describe the present invention to those having average knowledge in the art.

EXAMPLE

Hereinafter, the present invention will be described using examples and a test example as an example, however, the present invention is not limited to these examples and test example.

EXAMPLE

Preparation Example 1. Manufacture of Cylindrical Secondary Battery

An upper cap and a cylindrical can were prepared using a Ni-plated cold rolled steel sheet (SPCE), an electrode assembly was installed on the cylindrical can, and then a corrosion inhibiting washer was mounted on an upper part of a bidding unit while surrounding the upper cap of a cap assembly, and a cylindrical secondary battery was manufactured by sealing the upper part of the cap assembly.

Example 1. Preparation of Corrosion Resistant Tube $NaNO_2$ was well mixed and then finely pulverized until it had a uniform property at room temperature and atmospheric pressure. The pulverized $NaNO_2$ (3% by weight) was mixed with a melted polypropylene resin (97% by weight) to obtain a volatile corrosion inhibitor (VCI).

Then, the volatile corrosion inhibitor was mixed with a polyethylene terephthalate resin, a base resin, in a ratio of approximately 5:100 (parts by weight), and the mixture was prepared into a tube form using a mold frame.

Next, the cylindrical secondary battery of Preparation Example 1 was inserted to the corrosion resistant tube, hot air was applied thereto, and a cylindrical secondary battery in which a corrosion resistant tube was coated on the surface of a cylindrical secondary battery was manufactured as the tube was shrunk by the heat.

Comparative Example 1

A cylindrical secondary battery coated with a corrosion resistant tube was manufactured in the same manner as in Example 1, except that the volatile corrosion inhibitor was not included, and only a polyethylene terephthalate resin was used as the base resin.

Comparative Example 2

A cylindrical secondary battery coated with a corrosion resistant tube was manufactured in the same manner as in Example 1, except that the volatile corrosion inhibitor was not included, and only a polybutylene terephthalate resin was used as the base resin.

Test Example 1

50 cylindrical batteries were prepared by each method Of Comparative Examples 1 and 2 and Example 1. The cylindrical batteries were stored for 7 days in an isothermal-isohumidity chamber under a condition of approximately 65° C. and 90% R.H while being sealed with vinyl, and the number of rust occurrence in the battery was examined and compared.

When the results were visually checked after the storage, for Comparative Example 1, the rust occurred in 46 of the 50 batteries. For Comparative Example 2, the rust occurred in 44 of the 50 batteries. On the other hand, it was identified that rust occurred in only approximately 14 of the 50 cylindrical secondary batteries coated with the corrosion resistant tube in Example 1 of the present invention.

As a result, it can be seen that the corrosion resistant tube prepared in Example 1 of the present invention has an excellent corrosion inhibiting function.

Those skilled in the art may perform various applications and modifications within the scope of the present invention based on the descriptions made above.

The invention claimed is:

1. A secondary battery, comprising:
   (i) an electrode assembly comprising: a positive electrode, a negative electrode and a separator;
   (ii) a metal can,
      wherein the electrode assembly is built in the metal can; and
   (iii) a corrosion resistant tube, consisting of one layer, said layer comprising:
      a volatile corrosion inhibitor,
         wherein the volatile corrosion inhibitor comprises $NaNO_2$ and a polymer resin; and
      a base resin, wherein the base resin is a single material selected from the group consisting of polyethylene terephthalate (PET), nylon and polybutylene terephthalate (PBT), or a mixture of two or more types among these;
   wherein the corrosion resistant tube is coated on an outer circumference surface of the metal can,
   wherein the volatile corrosion inhibitor is included in 2 to 10 parts by weight based on 100 parts by weight of the base resin.

2. The secondary battery of claim 1, wherein the polymer resin is one selected from the group consisting of polypropylene (PP), polybutylene terephthalate, polyethylene, polyethylene terephthalate, teflon, polytetrafluoroethylene, rayon, mixed yarn, polyviscose and polynosic nylon, or a mixture of two or more types among these.

3. The secondary battery of claim 1, wherein $NaNO_2$ is included within 10 parts by weight based on 100 parts by weight of the polymer resin.

4. The secondary battery of claim 1, further comprising a washer mounted on an upper part of a cap assembly installed on an opened upper part of the metal can.

5. The secondary battery of claim 1, wherein a thickness of the corrosion resistant tube for a secondary battery is from 0.05 mm to 0.1 mm.

6. The secondary battery of claim 1, wherein gamma iron trioxide ($\gamma$-$Fe_2O_3$) is formed at an end of the metal can.

7. The secondary battery of claim 6, wherein the gamma iron trioxide is formed to a thickness of 10 Å to 1000 Å.

8. The secondary battery of claim 4, wherein the metal can is a cylindrical can, and in the cap assembly, a positive electrode protruded terminal connected to the electrode assembly is formed in the middle.

9. The secondary battery of claim 4, wherein the metal can is a rectangular can, and in the cap assembly, a negative electrode protruded terminal connected to an electrode terminal is formed in the middle.

10. The secondary battery of claim 4, wherein the washer is fixed on an upper surface of the cap assembly through adhesion or mechanical binding.

11. The secondary battery of claim 4, wherein the washer is a corrosion inhibiting washer including a volatile corrosion inhibitor and a base resin.

* * * * *